(No Model.)
W. F. DANA.
DEVICE FOR MANIPULATING CAN CAGES.
No. 424,278. Patented Mar. 25, 1890.
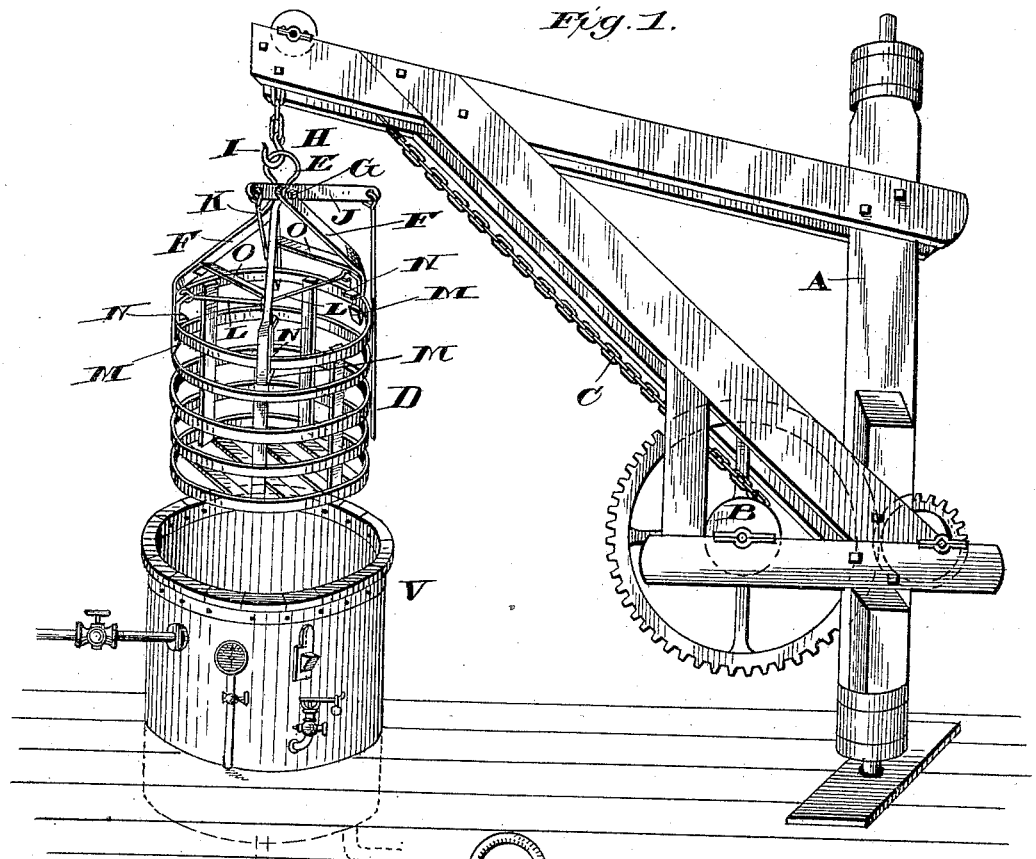
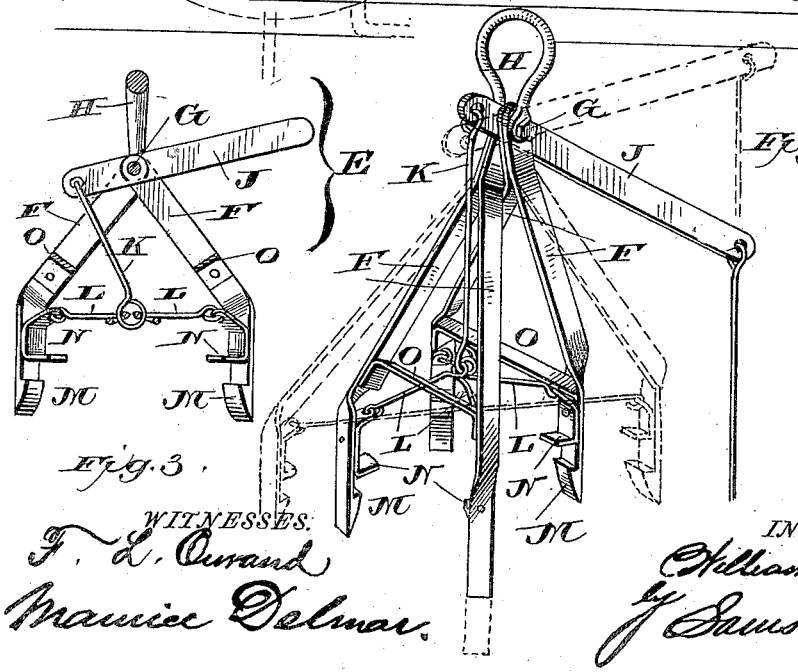
WITNESSES:
F. L. Ourand
Maurice Delmar
INVENTOR:
William F. Dana
by Sams Bagger & Co.
Attorneys

UNITED STATES PATENT OFFICE.

WILLIAM FISHER DANA, OF BELPRE, OHIO.

DEVICE FOR MANIPULATING CAN-CAGES.

SPECIFICATION forming part of Letters Patent No. 424,278, dated March 25, 1890.

Application filed February 8, 1890. Serial No. 339,687. (No model.)

*To all whom it may concern:*

Be it known that I, WILLIAM FISHER DANA, a citizen of the United States, and a resident of Belpre, in the county of Washington and State of Ohio, have invented certain new and useful Improvements in Devices for Manipulating Can-Cages in Canning-Factories; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view illustrating the manner of using my device for manipulating can-cages. Fig. 2 is a perspective view of the device itself; and Fig. 3 is a sectional view of the device, showing it in position ready for the attachment of a cage.

Like letters of reference denote corresponding parts in all the figures.

This invention relates to devices for manipulating the can-cages in the so-called "process-room" in canning-factories. In this room the filled cans are placed in several tiers in a metallic cage or basket, usually cylindrical in shape, which is suspended from a derrick in such a manner that it may be swung over and lowered into the steaming-vat by means of a windlass. After the cage has been immersed in the vat for a sufficient length of time to expel all air from the cans and their contents the cage is again raised and withdrawn from the vat by means of the windlass and derrick, when a fresh cage charged with cans is lowered into the vat, and so on. This raising and lowering or manipulation of the filled or charged cages is usually accomplished by hooking the upper rim of the cage into large hooks or grapples, which are in turn attached to a hook at one end of the chain, by which the cage is raised or lowered. This manner of handling the cage necessarily occupies considerable time in attaching or detaching the grappling-hooks; and the object of my invention is to save time and reduce the labor of manipulating the cages to a minimum.

With this object in view my invention consists in the detailed construction and combination of parts of the automatic grappling and holding device which will be hereinafter more fully described and claimed.

Reference being had to the accompanying drawings, the letter A designates the derrick; B, the windlass; C, the hoisting-chain; D, the cage, and V the steaming-vat, all of which are of the usual construction and form no part of my invention, they being merely illustrated in order to show the manner of using my device. The latter (shown at E) consists of four arms F, arranged in pairs, the two arms of each pair converging and being united at their upper ends. The two pairs of arms are hinged together at their converging upper ends by means of a bolt G, which also forms the means of attachment of a clevis H, by means of which the device is suspended from the hook I. This bolt G also forms the fulcrum for a lever J, which is inserted between the upper converging ends of the two pairs of arms F. To the short arm of this lever J is attached a rod K, the lower end of which is connected by four rods L to the arms F. The lower ends of these arms are shaped to form hooks M, and a short distance above these hooks are inwardly-projecting brackets N, the space between the hooks M and brackets N being of sufficient width to accommodate the upper ring or hoop of the cage.

In order to strengthen the device, the arms F F of each pair may be connected by means of a brace or cross-piece O.

The manner of using this device is as follows: After the cage has been charged or filled with cans the device is placed over it, and by pushing the long end of lever J in an upward direction the hooked lower ends of the two pairs of arms F will be separated, through the operation of the rod K and its connecting-rods L, in such a manner that the lower hooked ends of said arms will straddle the top of the cage. The device being in this position, the inwardly-projecting brackets N will prevent it from slipping down too far over the cage, but just far enough to enable the hooks M to engage or catch under the uppermost ring or hoop of the cage, when the arms are drawn together by lowering the long arm of lever J. In this position the device will firmly grapple and hold the cage by the first or uppermost ring or hoop, so that it may readily be swung over and lowered into the vat. To release the cage from the holding device all that is necessary is to push the long arm of the lever in an upward direction, when the lower hooked ends of the holding-arms will be spread apart, and thereby be disengaged or released from the cage.

It will be observed that this device is very simple, strong, and durable in its construction, and that it may be attached to or detached from the cages undergoing manipulation in a moment of time, thereby saving a great deal of time and labor in the process of steaming the cans. If desired, a handle-rod may be attached to the outer end of the long arm of lever J, for the purpose of conveniently operating the lever from the floor of the process-room.

Having thus described my invention, I claim and desire to secure by Letters Patent of the United States—

The hereinbefore-described grappling or holding device, comprising the following elements: the clevis, the lever, the fulcrum-bolt, the arms F, arranged in pairs and provided at their lower ends with inwardly-projecting hooks and brackets, the rod attached to the short end of the lever, and the rods connecting the last-named rod with the lower ends of the hooked arms, all constructed and combined to operate substantially in the manner and for the purpose set forth.

In testimony that I claim the foregoing as my own I have hereunto affixed my signature in presence of two witnesses.

WILLIAM FISHER DANA.

Witnesses:
CHAS. S. DANA,
JOHN DANA.